(12) United States Patent
McCarthy

(10) Patent No.: US 11,359,821 B2
(45) Date of Patent: Jun. 14, 2022

(54) STOVE TOP COVER

(71) Applicant: Matthew McCarthy, Parma, OH (US)

(72) Inventor: Matthew McCarthy, Parma, OH (US)

( * ) Notice: Subject to any disclaimer, the term of this patent is extended or adjusted under 35 U.S.C. 154(b) by 136 days.

(21) Appl. No.: 16/428,140

(22) Filed: May 31, 2019

(65) Prior Publication Data
US 2019/0368744 A1 Dec. 5, 2019

Related U.S. Application Data

(60) Provisional application No. 62/679,523, filed on Jun. 1, 2018.

(51) Int. Cl.
*F24C 15/12* (2006.01)
*F24C 15/14* (2006.01)
(Continued)

(52) U.S. Cl.
CPC ............... *F24C 15/12* (2013.01); *A47J 36/06* (2013.01); *F24C 3/126* (2013.01); *F24C 7/083* (2013.01);
(Continued)

(58) Field of Classification Search
CPC .......... F24C 15/12; F24C 15/14; F24C 15/36; F24C 15/007; F24C 3/126; F24C 7/083; A47J 36/06; A47J 36/16
(Continued)

(56) References Cited

U.S. PATENT DOCUMENTS 727,251 A * 5/1903 Allen ...................... F24C 15/12
126/211
764,581 A * 7/1904 Grove ...................... F24C 15/10
126/221
(Continued)

FOREIGN PATENT DOCUMENTS

DE 2701331 A * 7/1978
DE 3427453 A1 * 2/1986 .............. F24C 15/12
(Continued)

OTHER PUBLICATIONS

U.S. Appl. No. 16/428,140, filed Feb. 13, 2021_CA_2067702_A_H.pdf (Year: 1993).*
(Continued)

*Primary Examiner* — Steven B McAllister
*Assistant Examiner* — Daniel E. Namay
(74) *Attorney, Agent, or Firm* — Gugliotia & Gugliotia

(57) ABSTRACT

A stove top cover includes a top surface and a bottom surface and forming a cutout extending there through and having a periphery that defines the cutout. Still further, the stove top cover can include a flange or a series of flanges formed on the top surface that extends around the periphery of the cutout and projects outwardly from the top surface to a height and extends inwardly a distance toward and over an edge of a burner of the stove top. By using a nonflammable material (i.e., silicone, polyvinyl fluoride or PTFE-coated fiberglass) and overlapping the flange over the periphery of the burner, any contents that may overflow a pot or pan placed on the burner is entirely diverted onto the surface of the cover. With the cover, being easier to clean than the stove top, or even disposable, stove top cleaning is reduced or mitigated.

18 Claims, 2 Drawing Sheets

(51) Int. Cl.
   *F24C 3/12* (2006.01)
   *F24C 15/36* (2006.01)
   *F24C 7/08* (2006.01)
   *A47J 36/06* (2006.01)
   *F24C 15/00* (2006.01)
   *A47J 36/16* (2006.01)

(52) U.S. Cl.
   CPC .............. *F24C 15/14* (2013.01); *F24C 15/36* (2013.01); *A47J 36/16* (2013.01); *F24C 15/007* (2013.01)

(58) Field of Classification Search
   USPC ........................................ 126/221, 37 A, 211
   IPC ............... F24C 15/12,15/14, 15/36, 7/08; A47J 36/16
   See application file for complete search history.

(56) References Cited

U.S. PATENT DOCUMENTS

| | | | | |
|---|---|---|---|---|
| 916,657 | A * | 3/1909 | Bihler et al. | F24C 15/14 126/211 |
| 2,196,943 | A * | 4/1940 | Safrit | F24C 15/14 126/214 D |
| 2,287,309 | A * | 6/1942 | Howard | F24C 15/14 126/337 R |
| 3,490,123 | A * | 1/1970 | Clark | F24C 15/00 428/572 |
| 4,045,606 | A * | 8/1977 | Kalkowski | F24C 15/00 428/174 |
| 4,237,856 | A * | 12/1980 | Trombatore | F24C 15/12 126/214 D |
| 5,353,781 | A * | 10/1994 | Calvillo | F24C 15/12 126/221 |
| 6,044,834 | A * | 4/2000 | Zappetti | F24C 15/12 126/214 D |
| 6,263,869 | B1 * | 7/2001 | Abernethy | F24C 15/14 126/211 |
| 6,399,924 | B1 * | 6/2002 | Cai | F24C 15/12 126/211 |
| 8,353,282 | B1 * | 1/2013 | Fischer | B32B 3/266 126/221 |
| 10,281,158 | B2 * | 5/2019 | Herrera | F24C 15/12 |
| 10,584,883 | B2 * | 3/2020 | Brown | F24C 15/007 |
| 2009/0064990 | A1 * | 3/2009 | Wilkins | F24C 15/12 126/37 A |
| 2012/0012093 | A1 * | 1/2012 | Mishra | F24C 15/10 126/211 |
| 2015/0323198 | A1 * | 11/2015 | Ratz | F24C 15/12 126/221 |
| 2017/0276377 | A1 * | 9/2017 | Herrera | F24C 15/12 |
| 2018/0252416 | A1 * | 9/2018 | Lucas | F24C 15/12 |
| 2019/0032923 | A1 * | 1/2019 | Brown | F24C 15/00 |

FOREIGN PATENT DOCUMENTS

| | | | | |
|---|---|---|---|---|
| FR | 2487953 | A * | 2/1982 | |
| FR | 2626965 | A * | 10/1987 | |
| FR | 2656070 | A * | 6/1991 | |
| FR | 2678849 | A1 * | 1/1993 | ............ B08B 17/04 |
| JP | 05157253 | A * | 6/1993 | |
| JP | 05180449 | A * | 7/1993 | |
| JP | 05264046 | A * | 10/1993 | ............ F24C 15/14 |
| JP | 06159693 | A * | 6/1994 | |
| JP | 06180121 | A * | 6/1994 | ............... F24C 1/02 |
| JP | 07293903 | A * | 11/1995 | |
| JP | 08061679 | A * | 3/1996 | |
| JP | 07071773 | A * | 3/1997 | |
| JP | 09238841 | A * | 9/1997 | ........... C03C 17/007 |
| JP | 09243097 | A * | 9/1997 | |
| JP | 09264542 | A * | 10/1997 | |
| JP | 09280575 | A * | 10/1997 | |
| JP | 09303797 | A * | 11/1997 | |
| JP | 10019277 | A * | 1/1998 | |
| JP | 10030825 | A * | 2/1998 | |
| JP | 10054569 | A * | 2/1998 | |
| JP | 2000161684 | A * | 6/2000 | |
| JP | 2008089234 | A * | 4/2008 | |
| JP | 2008286517 | A * | 11/2008 | |

OTHER PUBLICATIONS

U.S. Appl. No. 16/428,140, filed Feb. 13, 2021_DE_29805155_U1_M.pdf (Year: 1019).*
U.S. Appl. No. 16/428,140, filed Feb. 13, 2021_DE_20304363_U1_M.pdf (Year: 0620).*
"JP_06159693_A_M-Machine Translation.pdf", Machine Translation, J-Plat Patent, Feb. 13, 2021. (Year: 2021).*
"JP_10054569_A_M-Machine Translation.pdf", Machine Translation, J-Plat Patent, Feb. 13, 2021. (Year: 2021).*

* cited by examiner

STOVE TOP COVER

CROSS REFERENCED TO RELATED APPLICATION

This application claims the benefit of U.S. Provisional Patent Application No. 62/679,523 filed on Jun. 1, 2018, entitled "Stove Top Cover", the content of which is incorporated herein in its entirety.

TECHNICAL FIELD

This disclosure generally relates to a stove top cover.

BACKGROUND

When cooking a food or a liquid on a stove top, spills, leaks, drips, and the like are inevitable. The food or the liquid can fall onto a burner, get trapped under a grate, travel to other portions of the stove top, or migrate from the stove top onto other portions of a kitchen such as a countertop, a cabinet, or a floor. The food or the liquid can cause various issues, such as burdensome clean-up, staining, and contamination. Furthermore, upon use of the stove top, the surface of the stove top can become extremely hot causing injury to a person in proximity or in contact with the stove top, or damage to objects placed on or around the stove top.

BRIEF DESCRIPTION OF THE DRAWINGS

Features, objects and advantages other than those set forth above will become more readily apparent when consideration is given to the detailed description below. Such detailed description makes reference to the following drawings.

SUMMARY

Figure 1:
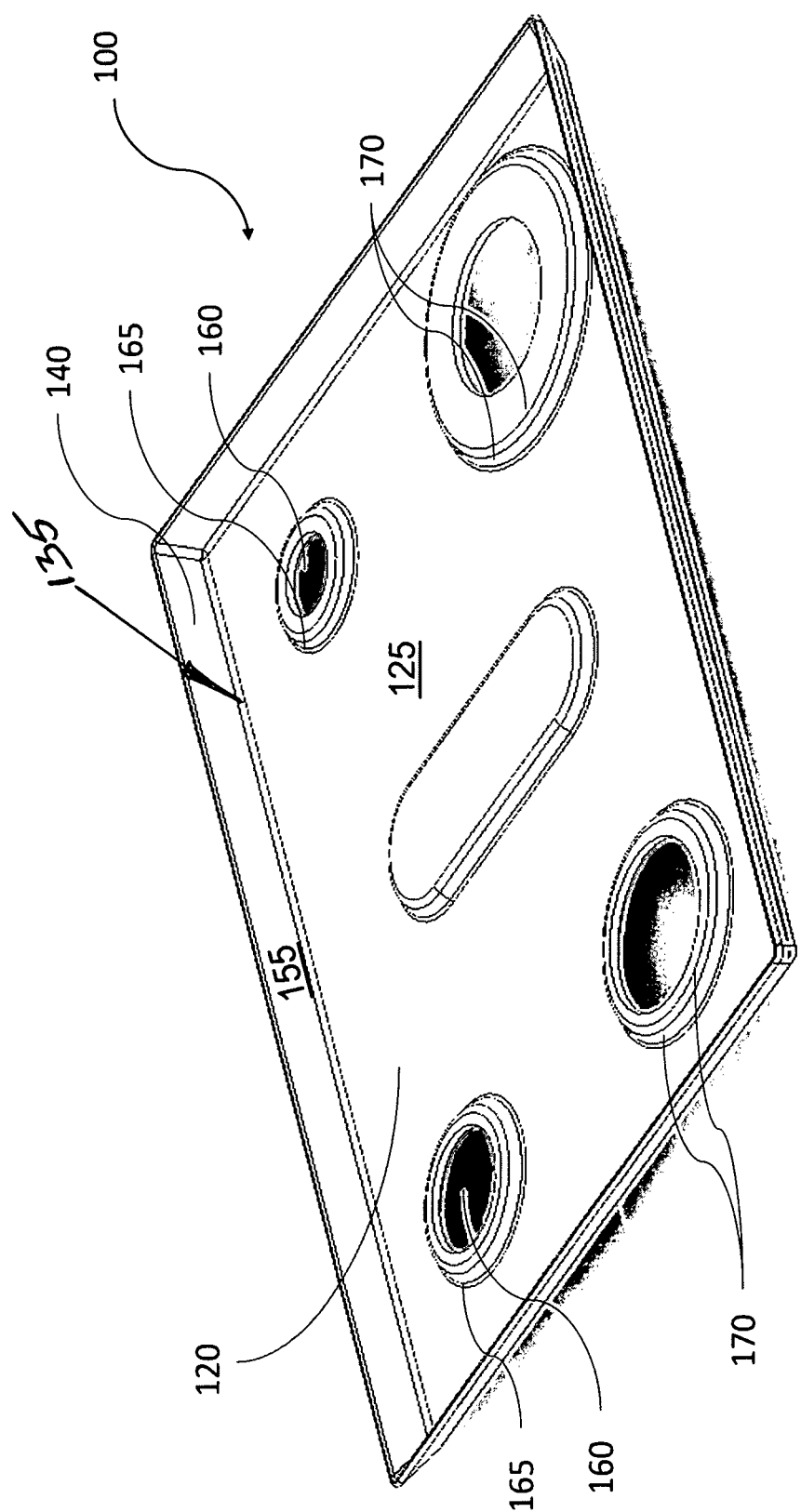
FIG. 1 depicts an example of a perspective view of a stove top cover.

In one example, a cover configured to engage a stove top is provided, which comprises a top surface, a bottom surface, and a border coupled to the top surface that extends around an outer perimeter of the cover and projects outwardly from the top surface. The cover further comprises a cutout extending through the top surface and the bottom surface having a periphery that defines the cutout, wherein the cutout is configured to surround a burner of the stove top. Further included is a flange coupled to the top surface that extends around the periphery of the cutout and projects outwardly from the top surface to a height and extends inwardly a distance toward an edge of a burner of the stove top In another example, a cover configured to engage a stove top is provided, which comprises a top surface, a bottom surface, and a cutout extending through the top surface and the bottom surface having a periphery that defines the cutout, wherein the cutout is configured to surround a burner of the stove top. Further included is a flange coupled to the top surface that extends around the periphery of the cutout and projects outwardly from the top surface to a height and extends inwardly a distance toward an edge of a burner of the stove top, wherein the distance the flange extends inwardly is such that the flange covers a portion of the burner.

This Summary is provided merely for purposes of summarizing some example embodiments to provide a basic understanding of some aspects of the disclosure. Accordingly, it will be appreciated that the above described example embodiments are merely examples and should not be construed to narrow the scope or spirit of the disclosure in any way. Other examples, aspects, and advantages of various disclosed embodiments will become apparent from the following detailed description taken in conjunction with the accompanying drawings which illustrate, by way of example, the principles of the described embodiments

DETAILED DESCRIPTION

The structures illustrated in the drawings include examples of the elements recited in the claims. The illustrated structures thus include examples of how a person of ordinary skill in the art can make and use the claimed invention. These examples are described to meet the enablement and best mode requirements of the patent statue without imposing limitations that are not recited in the claims. One or more of the elements of one embodiment may be used in combination with, or as a substitute for, one or more elements of another as needed for any particular implementation of the examples described herein.

The disclosure generally relates to a stove top cover. In some examples, the stove top cover can be constructed of one or more formable materials having one or more properties. The one or more materials can include, but are not limited to, fire retardant materials, fire resistant materials, heat resistant materials, wear resistant materials, scratch resistant materials, non-adhering materials, stain resistant materials, non-permeable materials, rigid materials, and elastic materials. The stove top cover can include a base, which can be fabricated to be geometrically and dimensionally commensurate with a stove top, wherein the stove top can include, but is not limited to, a gas stove top, an electric stove top and an induction stove top. In some examples, the stove top cover can further include one or more cutouts through which at least a portion of a burner of a stove can extend.

In an example, a portion of the base surrounding the one or more cutouts can be substantially fabricated of one or more of the fire retardant materials, the fire resistant materials, and the heat resistant materials to define a fire and heat averse band. In other examples, one or more remaining portions of the base can be fabricated of the one or more of fire retardant materials, fire resistant materials, and heat resistant materials. The stove top cover can further include a border to help shield an outer rim of the stove top from adulteration and to aid in retaining food and/or liquid within the boundaries of the stove top cover.

Figure 2:
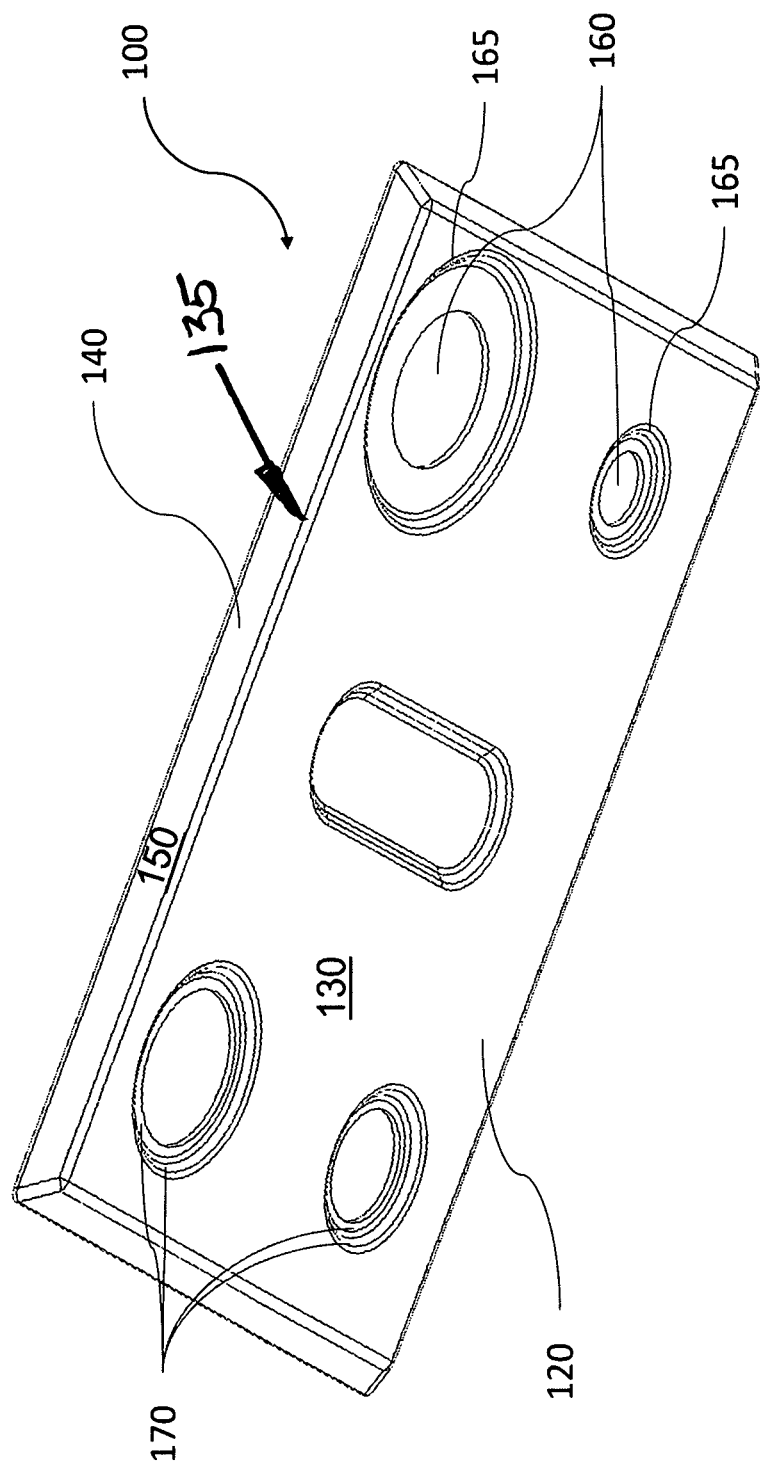
FIG. 2 depicts an example of a further perspective view of a stove top cover.

FIGS. 1 and 2 depict an example of a stove top cover 100. The stove top cover 100 can be configured to coordinate with and form to or couple with a surface of a stove top. The stove top can include, but is not limited to, a gas stove top, an electric stove top, and an induction stove top having one or a plurality of burners. The cover may be fabricated in a custom manner so as to form-fit the specific stove top with which it is being used.

The stove top cover 100 can be fabricated of one or more than one formable materials having one or more properties. The one or more properties of the materials can include, but are not limited to, fire retardation, fire resistance, heat resistance, wear resistance, scratch resistance, adhering resistance, stain resistance, non-permeability, rigidity, and elasticity. As such, the stove top cover 100 can be fabricated to include, but is not limited to, one or more of fire retardant materials, fire resistant materials, heat resistant materials, wear resistant materials, scratch resistant materials, non-adhering materials, stain resistant materials, non-permeable materials, rigid materials, and elastic materials. In an example, the stove top cover 100 can be fabricated to include one or more of silicone, polyvinyl fluoride, and polytetrafluoroethylene (PTFE) coated fiberglass materials.

By fabricating the stove top cover 100 from the one or more of the flexible and conformable, but non-ductile materials described herein, the stove top cover 100 has particular advantages over existing stove top covers. For example, when the stove top cover 100 is placed on the surface of the stove top, the stove top cover 100 will not become excessively hot and/or damaged, e.g., from an open flame or other heat produced by the burner or radiating from the stove top. Thus, the stove top cover 100 can provide safe surface conditions to help prevent or reduce the opportunity for burns or other high-temperature affiliated injuries to a person in contact or in proximity to the stove top, or damage to objects in contact or in proximity to the stove top. As an example, the stove top cover 100 can provide space for food preparation such that food, cookware, dishes and the like can rest on the stove top cover 100 without melting, burning, or otherwise becoming damaged from heat produced by the stove top. Similarly, as the stove top cover 100 is scratch-resistant, blades can be used on the stove top cover 100 to cut, slice or any other manner of dissecting food without damaging the stove top cover 100. Even further, in some examples, the stove top cover 100 can help slow or stop the spread of fire such as in the occurrence of a kitchen fire.

In another example, the stove top cover 100 can provide surface conditions that simplify cleaning of the stove top cover 100 by preventing boiling, solidification, baking, congealing, scorching, hardening or adhering of food or liquid on the stove top cover 100. In other examples, the stove top cover 100 is stain resistant such that food and liquids generally do not cause discoloration of the stove top cover 100. In an even further example, the stove top cover 100 is impermeable such that any food or liquid cannot seep through to the surface of the stove top.

The stove top cover 100 can include a base 120. The base 120 can include a top surface 125, a bottom surface 130 that directly opposes the top surface 125 and an outer perimeter. The base 120 can cover the surface of the stove top to provide a barrier against adulteration, such as food or liquids. In other examples, the base 120 can function as a shield and protect the surface of the stove top from scratches, wear, and other adverse effects that can be caused by persons and the surrounding environment. The outer perimeter can define an outer boundary of the base 120.

In an example, the base 120 can be fabricated to be geometrically and dimensionally commensurate with a geometry (e.g., a polygon, an ellipse, a customized geometry, an amorphous geometry, etc.) and dimensions of the surface of the stove top. In other examples, the base 120 can be of any geometry and any dimensions, irrespective of the geometry and dimensions of the surface of the stove top. For example, the base 120 can be constructed to correspond to a geometry and dimensions of a single burner of the stove top in the event the single burner alone is used for cooking. In another example, the base 120 can be fabricated to correspond to a geometry and dimensions of a half of the stove top or any other portion of the stove top. In an even further example, the base 120 can be constructed to have any geometry and dimensions, notwithstanding the geometry and dimensions of a burner or a portion of the stove top.

In some examples, the base 120 can be fabricated as a unitary molded or vacuum formed piece. In other examples, the base 120 can be constructed to include a plurality of pieces. In examples where the base 120 includes a plurality of pieces, each piece can include a plurality of perimeter edges that can define a geometry and dimensions of the piece. Each of the plurality of pieces can include one or more coupling mechanisms disposed on one or more of the perimeter edges. The coupling mechanisms can include, but are not limited to, magnets, snap fit joints, including annular, cantilever, or torsional snap fit joints, mechanical fasteners, mounting bosses, lips and grooves, pins, and the like. The coupling mechanisms of one piece can be configured to couple to the coupling mechanisms of adjacent pieces to partially or cumulatively form the base 120. In an example where the plurality of pieces utilize snap fit joints, the plurality of pieces can have sufficient stiffness, such as through material composition or material thickness, to achieve snap fitting. The plurality of pieces can be coupled together such that a seal can be created between each of the plurality of pieces, making the stove top cover 100 one of airtight and substantially airtight, such that any liquid or food is precluded from pervading and/or seeping through the base 120 to the surface and/or burner of the stove top when the stove top cover 100 is in use.

The base 120 can further include an opening (not shown in FIGS. 1 and 2). The opening can include one of a vent, a channel and a passageway. The opening can provide a pathway for heat and/or moisture generated by the stove top to the surrounding environment while covering the stove top. In other examples, where the surface of the stove top includes paint, the opening can prevent heat and/or moisture produced by the stove top from causing the paint to peel, crack, or lift away from the stove top while the base 120 is covering the stove top.

The base 120 can further include a reservoir (not shown in FIGS. 1 and 2). In some examples, the base 120 can include a single reservoir. In other examples, the base 120 can include a plurality of reservoirs. The reservoir can be located on the top surface 125 of the base 120. In some examples, the reservoir can be located at any location on the top surface 125 of the base. In other examples, the reservoir can be oriented to surround at least one of a cutout 160 of the base 120. Each reservoir can project downwardly from the top surface 125 toward the bottom surface 130 of the base 120, creating an indentation on the top surface 125 for capturing and containing liquids and food. The top surface 125 of the base 120 can include a gradient to direct liquids to the reservoir. Each reservoir can be shaped as a trench, a pit, or have any topography suitable for capturing and containing liquids.

The base 120 can further include a cutout 160. FIGS. 1 and 2 illustrate a stove top cover 100 having four cutouts 160 in the base 120. However, the base 120 can include one of a single cutout 160 and a plurality of cutouts 160. The cutout 160 can extend through the top surface 125 and the bottom surface 130 of the base 120 to create a hole in the base 120. The cutout 160 can include a periphery 165 that can define a geometry and dimensions of the cutout 160. A position of the cutout 160 on the base 120 can correspond to a position of a burner of the stove top. In examples having a plurality of cutouts 160, a position of each of the plurality of cutouts 160 on the base 120 can correspond to one of a plurality of burners on a stove top.

In some examples, where the stove top includes a gas stove top, the geometry and dimensions of the cutout 160 can be commensurate with a geometry and dimensions of a burner of the gas stove top, such that the cutout 160 can encompass a burner, yet permit the burner to extend through the cutout 160 and properly function. In other examples, where the stove top includes an electric stove top having one or more burners including coils, the geometry and dimensions of the cutout 160 can be commensurate with a geometry and dimensions of a burner of the electric stove top, such that the cutout 160 can encompass the burner, yet permit the burner to extend through the cutout 160 and properly function. In even further examples, where the stove top includes an induction stove top, the geometry and dimensions of the cutout 160 can be commensurate with a geometry and dimensions of a burner of the induction stove top, such that the cutout 160 can encompass the burner, yet permit the burner to extend through the cutout 160 and properly function. In any of the foregoing examples, the cutout 160 can be any geometry and any dimensions regardless of the geometry and dimensions of the burner, however, such that it does not interfere with function of the burner. The geometry of the cutout 160 can include, but is not limited to, a polygon, an ellipse, a customized geometry or an amorphous geometry.

In some examples, the base 120 can include a flange 170 coupled to a portion of the top surface 125 encompassing the cutout 160. In other examples, the base 120 can include a plurality of flanges 170, wherein each flange 170 is an extension of or coupled to a portion of the top surface 125 encompassing one cutout 160.

Specifically, the flange 170 can extend around the periphery 165 of the cutout 160, and project upwardly (i.e. project perpendicularly or at an angle) from the top surface 125 to a height. Subsequently, the flange 170 can extend inwardly (i.e. so as to decrease a diameter of an aperture created by the flange 170) a distance toward an edge of a burner of a stove top, creating a lip of the flange that may slightly overlap at least a portion of, but preferably the entire outer edge of the burner. In one example, the flange 170 can extend inwardly so as to leave a peripheral gap around a cap or a coil of the burner so as to not interfere with a flame or heat produced by the burner. In another example, the flange 170 can extend inwardly so as to partially or substantially enclose and/or cover a portion of a burner, yet not interfere with a flame or heat produced by the burner. The flange 170 can provide greater coverage of the surface of the stove top for enhanced protection of the stove top from adulteration and to further help prevent heat-related injuries and damage to a person or an object.

In further examples, the cutout 160 can include a plurality of flanges 170. In one example, a second flange 170 can extend around a top surface of the flange 170 and project outwardly from the top surface of the flange 170 to a second height and extend inwardly a second distance (creating a second lip) toward the edge of the burner or cover the burner as described above. In another example, a third flange 170 can extend around a top surface of the second flange 170 and project outwardly from the top surface of the second flange 170 to a third height and extend inwardly a third distance (creating a third lip) toward the edge of the burner or cover the burner as described above.

In some examples, the flange 170 or plurality of flanges 170 can be formed as part of the base 120, such as by molding the base 120 and the flange 170 or plurality of flanges 170 together through injection molding, thermoforming, or any other appropriate molding technique. In other examples, the flange 170 or plurality of flanges 170 can be collectively fabricated as discrete pieces from the base 120, each having a perimeter edge including one or more coupling mechanisms disposed on the perimeter edge so as to couple with one or more coupling mechanisms of the base 120 or to other flanges 170. The coupling mechanisms can include, but are not limited to, magnets, magnets, snap fit joints, including annular, cantilever, or torsional snap fit joints, mechanical fasteners, mounting bosses, lips and grooves and pins. In an example of the flange 170, or the plurality of flanges 170, and the base 120 utilizing snap fit joints, each can have sufficient stiffness, such as through material composition or material thickness, to achieve snap fitting.

The stove top cover 100 can further include a border 140. The border 140 can be coupled to the outer perimeter of the top surface 125 of the base 120, encasing the base 120. Further, the border 140 can project outwardly from the top surface 125 of the base 120. As such, the border 140 can help contain liquids and/or foods within the outer perimeter 135 of the base 120. For example, if a large volume of food and/or liquid spills onto the base 120, the border 140 can aid in prohibiting the food and/or liquid from going outside or underneath the stove top cover 100, thereby shielding the top surface and/or burner of the stove top from adulteration. In some examples, the border 140 can be free-standing, meaning that because a stove top is convex rather than concave, the border 140 is rigid enough to remain erect without the support of an outside rim of the stove top. In other examples, the border 140 can include an outside surface 150 that couples to a surface of an outside rim of the stove top. The outside surface 150 of the border 140 can overlay the surface of the outside rim of the stove top. Further, the border 140 can include an inside surface 155 that directly opposes the outside surface and faces toward the stove top.

In some examples, the border 140 can be fabricated to be geometrically and dimensionally commensurate with a geometry and dimensions of one of an outer perimeter (i.e. a convex stove top) and an outside rim (i.e. a concave stove top) of a stove top. For instance, the border 140 can have a height defined as a distance from the top surface 125 of the base 120 to an outermost point of the border 140. In some examples, the height of the border 140 can be one of commensurate with a height of the outside rim of the stove top or greater than or less than the height of the outside rim of the stove top. In other examples, the border 140 can be any geometry and any dimensions regardless of the geometry and dimensions of the outer perimeter or outside rim of the stove top.

In examples where the border 140 projects outwardly from the top surface 125 of the base 120, the border 140 can project at a 90 degree angle relative to the top surface 125. In another example, the border 140 can project outwardly from the top surface 125 at an angle commensurate with an angle of the surface of the outside rim of the stove top. In a further example, the border 140 can project outwardly from the top surface 125 at any angle relative to the top surface 125. In an even further example, the angle at which the border 140 can project outwardly from the top surface 125 of the base 120 can be adjustable to accommodate a user's needs or another stove top.

In some examples, the border 140 can include sides and corners. A side of the border 140 can correspond to a side of the base 120. A corner of the border 140 can correspond to a corner of the base 120. The corners of the border 140 can include a shape, defining a contour of the corner, including but not limited to, a geometry that is square, chamfered, beveled, filleted, or angled. Each corner can have a same or a different contour relative to any other corner.

In an example, the border 140 can be fabricated as a unitary piece. In another example, the border 140 can be fabricated to include a plurality of pieces. Where the border 140 includes a plurality of pieces, the border 140 can include discrete corners and side pieces. The plurality of pieces can be coupled together to form the border 140. Each of the plurality of pieces can include one or more coupling mechanisms for coupling the plurality of pieces together to form the border 140. The coupling mechanisms can include, but are not limited to, snap fit joints, including annular, cantilever, or torsional snap fit joints, mechanical fasteners, mounting bosses, lips, grooves, and pins. The coupling mechanisms of one piece can be configured to couple to the coupling mechanisms of adjacent pieces to partially or cumulatively form the border 140. In an example where the plurality of pieces utilize snap fit joints, the plurality of pieces can have sufficient stiffness, such as through material composition or material thickness, to achieve snap fitting. In a further example, the border 140 can be formed as part of the base 120, such as by molding the base 120 and the border 140 together through injection molding, thermoforming or any other suitable molding technique.

In some examples, the base 120 and/or the border 140 described herein can be formed from a single material layer or a plurality of material layers. In an example, the base 120 can include a single material layer, which can include the top surface 125 and the bottom surface 130. In another example, the base 120 can include a plurality of material layers where a first material layer can include the top surface 125 and a second material layer can include the bottom surface 130. In a further example, the base 120 can include a plurality of material layers where a first material layer can include the top surface 125, a second material layer can include the bottom surface 130, and one or more intermediate material layers can be oriented between the first and the second material layers.

Referring to the border 140, in an example, the border 140 can include a single material layer, which can include the outside surface 150 and the inside surface 155. In another example, the border 140 can include a plurality of material layers where a first material layer can include the outside surface 150 and a second material layer can include the inside surface 155. In a further example, the border 140 can include the plurality of material layers where a first material layer that can include the outside surface 150, a second material layer can include the inside surface 155 and one or more intermediate materials layers can be oriented between the first and the second materials layers. In examples where the base 120 and/or the border 140 includes a plurality of material layers, the material layers can be coupled together by any process or technique appropriate and effective for coupling the materials.

In some examples, where the base 120 and/or the border 140 includes a plurality of layers, each layer can include one or more of a fire retardant material, a fire resistant material, a heat resistant material, a non-permeable material, a wear resistant material, a scratch-resistant material, a non-adhering material, a stain resistant material, a rigid material, and an elastic material. In an example, a degree of a fire retardation, fire resistance, heat resistance, non-permeability, durability, non-adhesion, stain-resistance, rigidity, and elasticity of each layer can vary relative to each other. In another example, a degree of the foregoing properties of each layer can be substantially the same relative to each other. In a further example, a degree of the aforementioned properties of some layers can be substantially the same, while the degrees of such properties of other layers can vary.

In some examples, where the base 120 and/or the border 140 include a plurality of layers, the plurality of layers can have substantially similar thicknesses. Additionally, or alternatively, in some examples, the plurality of layers can have thicknesses that can vary relative to each other.

More specifically, FIGS. 1 and 2 show an example of the stove top cover 100 in a first condition. In the first condition, the stove top cover 100 can be releasably coupled to the surface of the stove top, such that the stove top cover 100 can be easily and efficiently removed from the surface of the stove top when desired. In some examples, the bottom surface 130 of the stove top cover 100 can overlay the top surface of the stove, and the outside surface 150 of the border 140 can overlay the surface of the outside rim of the surface of the stove top. The stove top cover 100 can contour and conform to a topography of the surface and the burners of the stove top. In some examples, a position of the stove top cover 100 on the top surface of the stove can be maintained via coupling mechanisms coupled to the stove top cover 100 along the bottom surface 130 of the base 120 and the outside surface 150 of the border 140. The coupling mechanisms can include, but are not limited to, magnets, elastics, adhering materials, and/or any other mechanism suitable for maintaining the position of the stove top cover 100.

Alternatively, the stove top cover 100 can be arranged in a second condition (not shown). In the second condition, the stove top cover 100 can be rolled compactly in any direction. In another example, the stove top cover 100 can also be folded compactly as desired. The stove top cover 100 can include a means for retaining the second condition including, but not limited to, magnets, fasteners, Velcro®, and clasps. The second condition can be useful to store, transport, or clean the stove top cover 100 or any other purpose. Generally, the stove top cover 100 is washable, portable and reusable as needed.

Furthermore, where the stove top cover 100 includes a plurality of pieces, the stove top cover 100 can be arranged in a third condition (not shown). In the third condition, the stove top cover 100 can be partially or completely assembled or disassembled. In some examples, the third condition can be suitable for cleaning, dishwashing, transporting, storing, or any other purpose.

What have been described above are examples. It is, of course, not possible to describe every conceivable combination of components or methods, but one of ordinary skill in the art will recognize that many further combinations and permutations are possible. Accordingly, the disclosure is intended to embrace all such alterations, modifications, and variations that fall within the scope of this application, including the appended claims. Thus, a stove top cover can be fabricated to accommodate different makes and models of stove tops to account for different stove top sizes, number of burners, type of burners, and the like.

Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A stove top cover comprising:
   a flat resting reusable collection mat that is geometrically and dimensionally commensurate with the stove top and having a top surface opposite a bottom surface, the flat resting reusable collection mat comprising a plurality of pieces having a sufficient stiffness and material composition or material thickness to achieve snap fitting making the flat resting reusable collection mat one of airtight and substantially airtight;

a border coupled to the top surface that extends around an outer perimeter of the cover and projects from the top surface;

at least one cutout extending through the top surface and the bottom surface having a periphery that defines the cutout, wherein the cutout is geometrically and dimensionally configured to coordinate with and surround a burner of the stove top; and a flange coupled to the top surface that extends around the periphery of the cutout.

2. The stove top cover of claim 1, wherein said molded, non-metallic flat resting collection mat is formed substantially of a material selected from a group consisting of: silicone; polyvinyl fluoride; and PTFE-coated fiberglass.

3. The cover of claim 2, further comprising a plurality of cutouts, wherein each is configured to coordinate with one of a plurality of burners of the stove top.

4. The cover of claim 2, further comprising a reservoir oriented on the top surface that surrounds at least one burner and configured to capture substances.

5. The cover of claim 2, further comprising:
a coupler selected from a group consisting of: magnets; snap fit joints; annular snap fit joints; cantilever snap fit joints; torsional snap fit joints; mechanical fasteners; mounting bosses; lips and grooves; and pins;
wherein said coupler is oriented on the bottom surface to retain the cover to the stove top surface in a manner such that the cover is releasably coupled to the stove top surface.

6. The cover of claim 1, further comprising a plurality of cutouts, wherein each is configured to coordinate with one of a plurality of burners of the stove top.

7. The cover of claim 6, further comprising a reservoir oriented on the top surface and configured to capture substances.

8. The cover of claim 6, further comprising:
a coupler selected fro ma group consisting of: magnets; snap fit joints; annular snap fit joints; cantilever snap fit joints; torsional snap fit joints; mechanical fasteners; mounting bosses; lips and grooves; and pins;
wherein said coupler is oriented on the bottom surface to retain the cover to the stove top surface in a manner such that the cover is releasably coupled to the stove top surface.

9. The cover of claim 1, further comprising a reservoir oriented on the top surface and configured to capture substances.

10. The stove top cover of claim 9, wherein the reservoir surrounds at least one burner.

11. The cover of claim 1, further comprising:
a coupler selected from a group consisting of: magnets; snap fit joints; annular snap fit joints; cantilever snap fit joints; torsional snap fit joints; mechanical fasteners; mounting bosses; lips and grooves; and pins;
wherein said coupler is oriented on the bottom surface to retain the cover to the stove top surface in a manner such that the cover is releasably coupled to the stove top surface.

12. The stove top cover of claim 1, further comprising:
a first flange coupled to the top surface that extends around the periphery of the cutout and projects outwardly from the top surface to a height and extends inwardly a distance toward and over at least a portion of an edge of a burner of the stove top.

13. The stove top cover of claim 12, wherein the distance the first flange extends inwardly is such that the flange covers a portion of the burner.

14. The stove top cover of claim 12, further comprising:
a second flange that extends around a top surface of the first flange and projects outwardly from the top surface of the first flange to a second height and extends inwardly a second distance toward and over at least a portion of the edge of the burner.

15. The stove top cover of claim 14, further comprising:
a third flange that extends around a top surface of the second flange and projects outwardly from the top surface of the second flange to a third height and extends inwardly a third distance toward and over at least a portion of the edge of the burner.

16. The cover of claim 1, wherein said single piece mat is further formed of a plurality of layers of material.

17. The cover of claim 16, wherein said plurality of layers of material have substantially similar thicknesses.

18. The cover of claim 16, wherein said plurality of layers of material have thicknesses that vary relative to each other.

* * * * *